United States Patent [19]
McMichael

[11] B 3,989,186
[45] Nov. 2, 1976

[54] ENGINE INDUCTION AIR FLOW CONTROL
[75] Inventor: John D. McMichael, Flint, Mich.
[73] Assignee: General Motors Corporation, Detroit, Mich.
[22] Filed: Sept. 3, 1974
[21] Appl. No.: 502,652
[44] Published under the second Trial Voluntary Protest Program on February 24, 1976 as document No. B 502,652.

[52] U.S. Cl............................. 236/13; 123/122 D; 123/122 H; 123/124 A; 137/111; 236/101 C
[51] Int. Cl.²........................................ G05D 23/08
[58] Field of Search............ 236/13, 101, 93, 92 D; 123/122 D, 122 H, 124 A; 137/111

[56] References Cited
UNITED STATES PATENTS

| | | | |
|---|---|---|---|
| 3,513,817 | 5/1970 | Kearsley | 123/122 D |
| 3,744,715 | 7/1973 | Maddocks | 236/13 |
| 3,779,223 | 12/1973 | Piech et al. | 123/122 D |
| 3,782,349 | 1/1974 | Kamo et al. | 236/101 C X |

Primary Examiner—William E. Wayner
Assistant Examiner—William E. Tapolcai, Jr.
Attorney, Agent, or Firm—C. K. Veenstra

[57] ABSTRACT

In an internal combustion engine air cleaner snorkel having an end open to ambient temperature air and an auxiliary inlet open to heated air, the induction air flow temperature is regulated by a pivoted damper assembly having a guide member positioned by a coiled bimetal and a damper member biased by a torsion spring for concomitant operation with the guide member. The damper member has a main blade portion responsive to the induction air flow rate and controlling ambient air flow and a pair of lateral blade portions controlling heated air flow but unresponsive to the induction air flow rate. Under conditions of high induction air flow the damper member moves away from the guide member against the bias of the torsion spring to permit ambient air flow through the open end and to block heated air flow through the auxiliary inlet.

4 Claims, 6 Drawing Figures

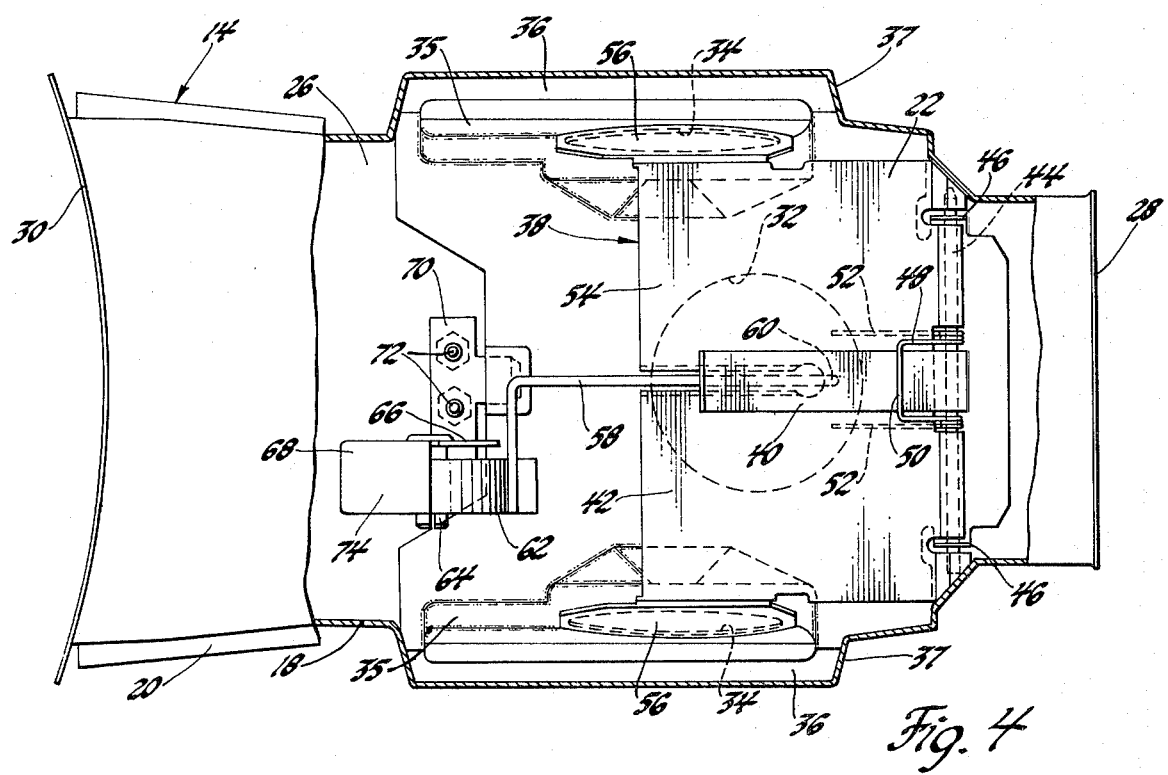
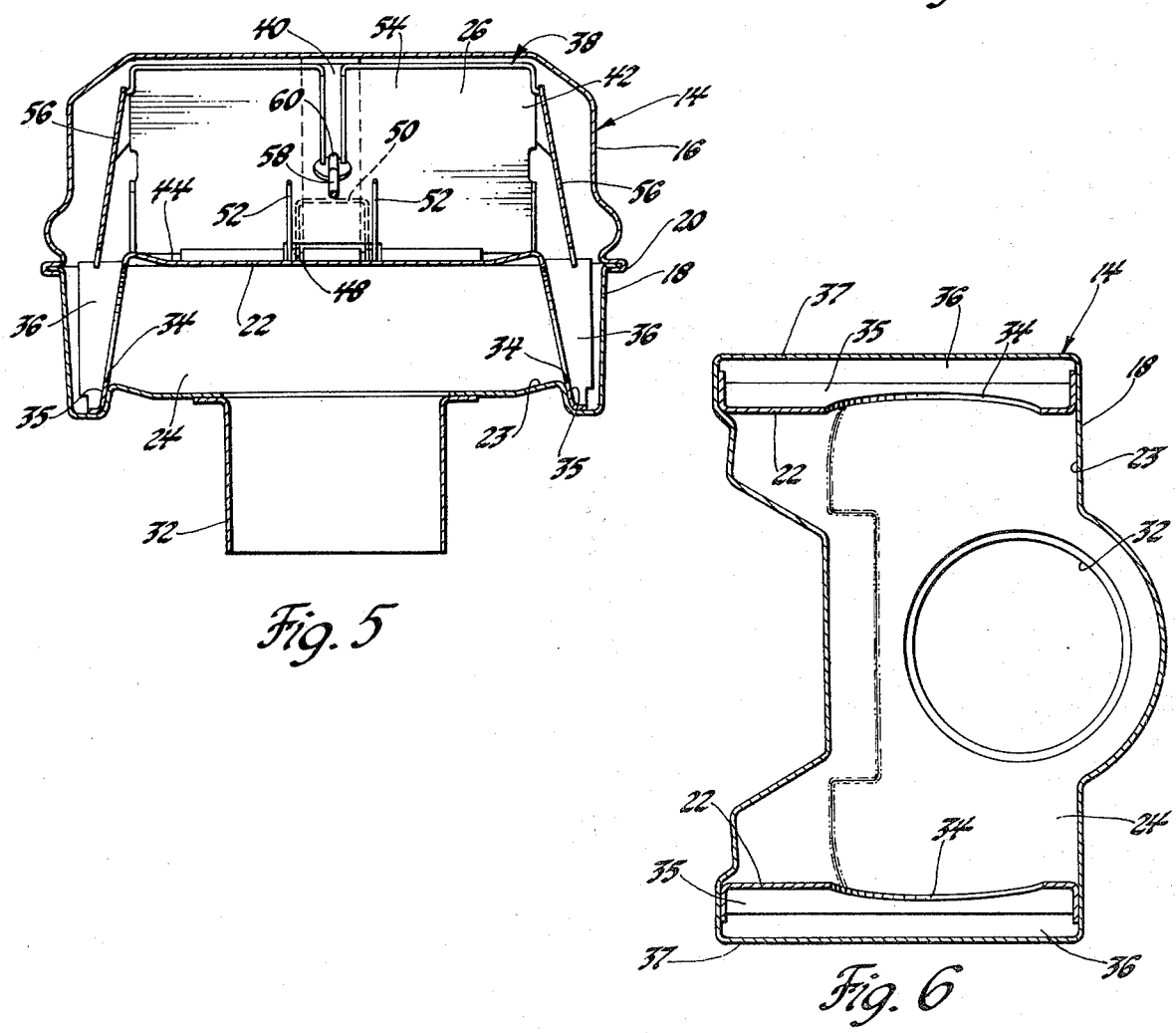
Fig. 4
Fig. 5
Fig. 6

ENGINE INDUCTION AIR FLOW CONTROL

This invention relates to an engine induction air flow control and more particularly to such a control having a novel induction air flow damper assembly which is especially suitable for regulating the induction air flow temperature.

It has become common practice to regulate the temperature of internal combustion engine induction air flow by positioning a damper in the air cleaner snorkel to control air flow through the end of the snorkel open to ambient air and through an auxiliary heated air inlet. The damper usually has one portion controlling ambient air flow and another portion controlling heated air flow, the two portions being rigidly secured together. In operation, the damper has been responsive to the induction air flow rate and, at high induction air flow rates, was intended to permit only ambient air flow and to prevent heated air flow to maximize engine efficiency. However, where the damper has been positioned by a bimetal coil responsive to the induction air flow temperature, response of the damper to the rate of induction air flow has been resisted by the force of the bimetal coil. In addition, where the secondary portion of the damper has reciprocated toward and away from the heated air inlet, closure of the heated air inlet at high induction air flow rates has been resisted by air flow therethrough.

This invention provides a new induction air flow control which obviates these difficulties to more efficiently regulate the induction air flow temperature.

The induction air flow control provided by this invention achieves these objectives by a damper assembly including a guide member operated directly from the coiled bimetal and a damper member which is spring biased to operate with the guide member but which moves away from the guide member against the spring bias as the induction air flow reaches a selected rate. Further, the damper member has a main blade portion which is responsive to the rate of induction air flow and controls ambient air flow and an auxiliary blade portion which slides across the auxiliary inlet to control heated air flow without responding to the induction air flow rate.

The details as well as other features and advantages of this invention are set forth in the following description and are shown in the drawings in which:

FIG. 4 is a top plan view of the FIG. 3 snorkel, parts being broken away to show further details of the damper assembly;

FIG. 5 is a view taken along line 5—5 of FIG. 2, further enlarged and showing details of the heated air flow path; and FIG. 6 is a sectional view taken along line 6—6 of FIG. 2, further enlarged and showing additional details of the heated air flow path.

Figure 1:
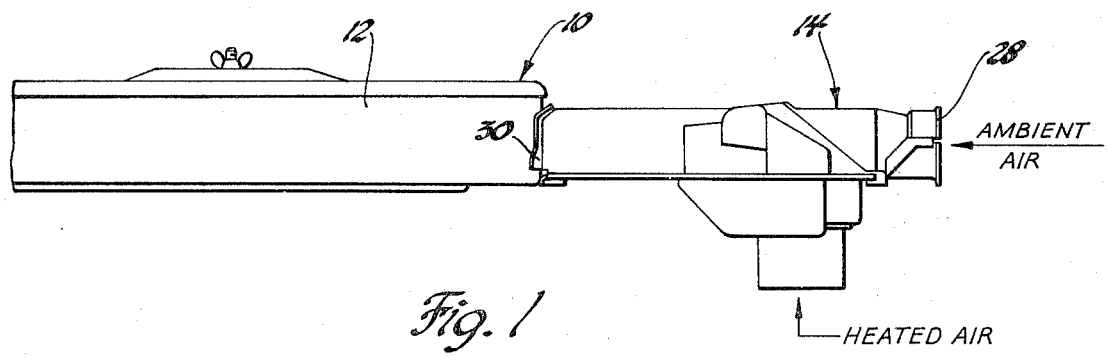
FIG. 1 is a side elevational view of an internal combustion engine air cleaner embodying this invention.

Referring first to FIG. 1, an internal combustion engine air cleaner 10 includes a main housing 12, enclosing a filter element (not shown), and a snorkel 14 through which engine induction air flow is received.

As shown in FIGS. 2–5, snorkel 14 includes an upper shell member 16 and a lower shell member 18 which are crimped along the sides 20 (as particularly shown in FIG. 5). An intermediate plate 22 is received between shells 16 and 18 and overlies a recess 23 formed in lower member 18 to separate a chamber 24 from the main induction air flow conduit 26.

Induction air flow conduit 26 has an end 28 forming a primary inlet open to air at ambient temperature and an outlet 30 which discharges into main housing 12. Chamber 24 has a fitting 32 which is adapted for connection to a source of heated air such as a stove surrounding the engine exhaust manifold. Heated air flows from chamber 24 through a pair of openings 34 formed in downwardly extending flanges 35 of intermediate plate 22, into a pair of lateral channels 36 defined outwardly of flanges 35 by projections 37 formed in members 16 and 18, and then upwardly to main induction passage 26 at a location downstream of primary inlet 28. The heated air flow path defined by fitting 32, chamber 24, and openings 34 will be denominated an auxiliary or heated air inlet.

A damper assembly 38 has a narrow guide member 40 and a damper member 42 independently pivoted about a pin 44. Pin 44 is received in a pair of upstanding ears 46 formed in intermediate member 22. A torsion spring 48 (best shown in FIG. 4) has a laterally extending portion 50 overlying guide member 40 and a pair of longitudinally extending ends 52 underlying damper member 42.

Damper member 42 has a broad main blade portion 54 extending across and controlling flow through ambient air inlet 28 and a pair of auxiliary or lateral blade portions 56 which are disposed in channels 36 to slide across or traverse heated air inlet openings 34.

A control arm 58 has a curved end 60 in continuous contact with guide member 40. The opposite end of control arm 58 is welded to a coiled bimetal 62 which is secured on a shaft 64 downstream of channels 36. Shaft 64 is secured against rotational movement in the upstanding flange 66 of a mounting member 68 which also has a horizontal flange 70 secured to lower shell 18 by a pair of screws 72. Flange 66 has a plurality of shield portions 74 partially enclosing bimetal coil 62 to assure proper response of coil 62 to the temperature of the induction air flow in passage 26.

Figure 2:
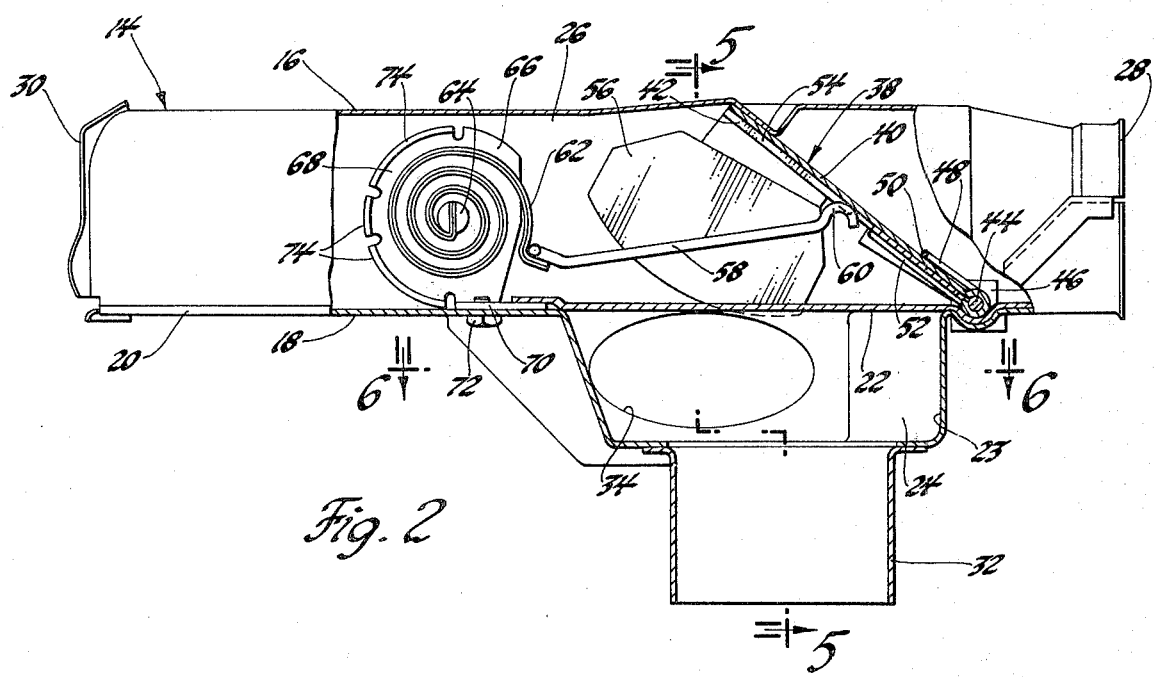
FIG. 2 is an enlarged side elevational view of the snorkel from the FIG. 1 air cleaner, parts being broken away to show the damper assembly in a low temperature, low air flow position.

In operation, damper assembly 38 initially assumes the position shown in FIG. 2, obstructing air flow through ambient air inlet 28 and permitting heated air flow through auxiliary air inlet openings 34 and channels 36 to main induction passage 26. Damper member 42 responds to induction air flow, tending to pivot counterclockwise about pin 44 and acting through torsion spring 48 to maintain guide member 40 in contact with curved end 60 of control arm 58. As the induction air flow warms to a selected temperature, coil 62 lowers arm 58, allowing guide member 40 and damper member 42 to pivot counterclockwise. As this occurs, air flow through openings 34 is partially obstructed by auxiliary blades 56 and an increasing proportion of ambient temperature air is permitted to flow through ambient air inlet 28 over main blade 54. In this manner, bimetal coil 62 moves damper member 42 between the FIG. 2 and the FIG. 3 positions to control flow through ambient air inlet 28 and heated air inlet openings 34 and thus regulate the temperature of induction air flow through passage 26. Under ordinary conditions of operation, bimetal coil 62 will position damper member 42 intermediate the FIGS. 2 and 3 positions to maintain an induction air flow temperature of, for example, 115°F.

Figure 3:
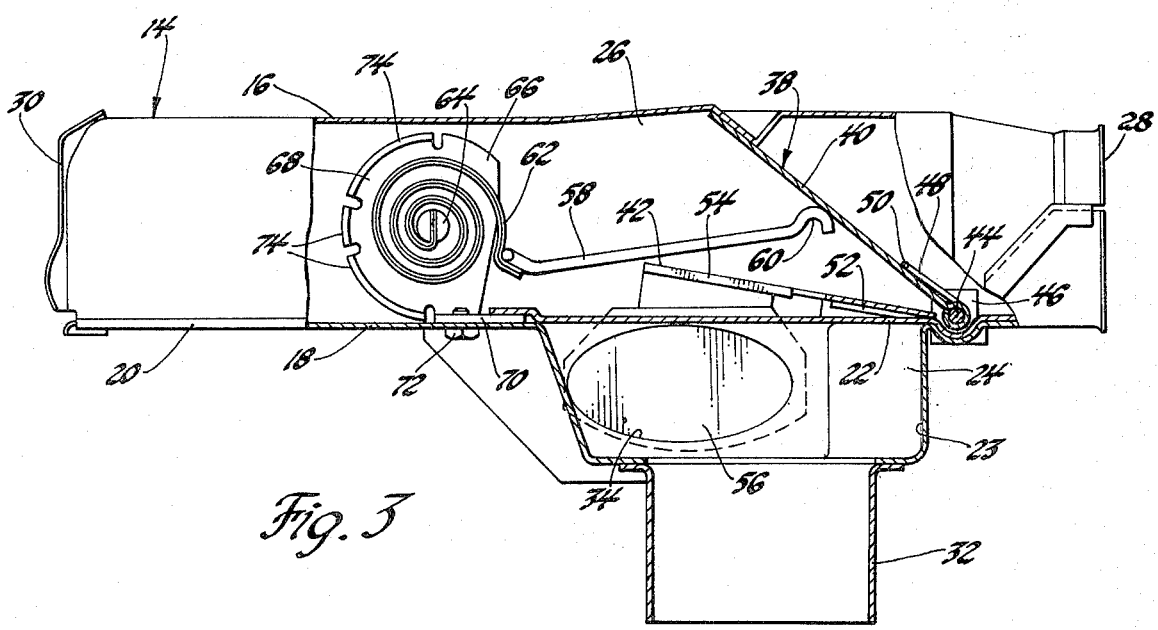
FIG. 3 is a view similar to FIG. 2 showing the damper assembly in a low temperature, high air flow position.

If bimetal coil 62 has not permitted damper member 42 to assume the position shown in FIG. 3 when the engine demands induction air flow in excess of, for example, 60 cubic feet per minute, damper member 42 is drawn away from guide member 40 against the bias of torsion spring 48 and caused to assume the position shown in FIG. 3 by the force of air flow through induction passage 26. In this position, auxiliary blades 56 obstruct air flow through heated air inlet openings 34, and main blade 54 permits unrestricted air flow through ambient air inlet 28.

It will be appreciated, therefore, that damper member 42 must overcome the bias only of spring 48 and not of bimetal coil 62 when high induction air flow is demanded and accordingly is more efficient in providing the ambient temperature air required under high induction air flow conditions.

Further, it will be appreciated that auxiliary blades 56, in sliding across heated air inlet openings 34, have minimal response to air flow through openings 34 and thus are more efficient in obstructing heated air flow during high induction air flow conditions.

Finally, it will be appreciated that this engine induction air flow control may exhibit the same efficiencies of operation even though it may be assembled in other configurations. As but one example of another such configuration, the heated air inlet could open rearwardly (instead of laterally) into a channel leading upwardly to the main induction air flow passage, and the auxiliary blade portion of the damper member could depend from the rear (instead of the side) edge of the main blade portion for traversing the rearward opening.

The embodiments of the invention in which an exclusive property or privilege is claimed are defined as follows:

1. An internal combustion engine induction air flow control comprising means defining a generally horizontal air flow conduit having a primary air inlet and an air outlet at opposite ends thereof, an auxiliary air inlet below said air flow conduit, and a channel leading from said auxiliary air inlet upwardly to said conduit, a damper having a main portion disposed in said conduit for controlling air flow through said primary inlet and an auxiliary portion disposed in said channel and adapted to slide across said auxiliary inlet for controlling air flow therethrough independent of the rate of air flow therethrough, and pivot means mounting said damper for pivotal movement between a first position wherein said main portion obstructs air flow through said primary inlet and said auxiliary portion permits air flow through said auxiliary inlet and a second position wherein said main portion permits air flow through said primary inlet and said auxiliary portion obstructs air flow through said auxiliary inlet, whereby said damper may proportion air flow through said primary and auxiliary inlets independent of the rate of air flow through said auxiliary inlet.

2. An internal combustion engine induction air flow control comprising means defining an air flow conduit having a primary air inlet and an air outlet at opposite ends thereof, an auxiliary air inlet, and a channel opening into said conduit from said auxiliary air inlet, an air flow damper having a main portion disposed in said conduit for controlling air flow through said primary air inlet and an auxiliary portion disposed in said channel and adapted to slide across said auxiliary air inlet for controlling air flow therethrough independent of the rate of air flow therethrough, and pivot means mounting said damper for pivotal movement between a first position wherein said main portion obstructs air flow through said primary air inlet and said auxiliary portion permits air flow through said auxiliary air inlet and a second position wherein said main portion permits air flow through said primary air inlet and said auxiliary portion obstructs air flow through said auxiliary air inlet, and actuator means including spring means biasing said damper to said first position under certain conditions of operation, and wherein said main portion of said damper is responsive to air flow through said conduit and moves said damper toward said second position against the bias of said spring means as the rate of air flow through said conduit increases.

3. An internal combustion engine air cleaner comprising a snorkel having upper and lower members defining a generally horizontal induction air flow conduit including an end open to air at ambient temperature, said members having lateral projections defining a pair of channels disposed outwardly and on opposite sides of said conduit downstream of said end and opening into said conduit, said lower member further having a lower recess, an intermediate member overlying said recess to define an auxiliary air inlet chamber below said conduit and separated therefrom by said intermediate member, said chamber being adapted for connection to a source of heated air, said intermediate member including a pair of depending flanges separating said chamber from said channels, said flanges having openings permitting generally horizontal air flow from said chamber to said channels, a pivot pin supported by said intermediate member at the bottom of said conduit between said end and said channels, a guide member pivoted on said pin and extending upwardly and downstream therefrom, a coiled bimetal disposed in said conduit downstream of said channels, a control arm connecting said bimetal to said guide member to bias said guide member upwardly about said pivot at induction air flow temperatures below a selected value and permitting lowering of said guide member about said pivot pin at induction air flow temperatures below the selected value and positioning said guide member intermediate its uppermost and lowermost positions to maintain the selected induction air flow temperature, a damper member pivoted on said pin and extending upwardly and downstream therefrom and underlying said guide member, said damper member having a main blade portion disposed in said conduit for controlling flow through said end and a pair of lateral blade portions disposed in said channels for controlling heated air flow through said openings, and spring means biasing said damper member and said guide member for concomitant operation whereby said bimetal positions said damper member to obstruct ambient air flow and to permit heated air flow at induction air flow temperatures below the selected value, to permit ambient air flow and to obstruct heated air flow at induction air flow temperatures above the selected value, and to proportion ambient air flow and heated air flow to maintain the selected induction air flow temperature, and further whereby said damper member may move downwardly about said pivot pin against the bias of said spring means to permit ambient air flow and to obstruct heated air flow at induction air flow rates above a selected value.

4. An internal combustion engine air cleaner comprising a snorkel having upper and lower members defining a generally horizontal induction air flow conduit including an end open to air at ambient temperature, said members having lateral projections defining a pair of channels disposed outwardly and on opposite sides of said conduit downstream of said end and opening into said conduit, said lower member further having a lower recess, an intermediate member overlying said recess to define an auxiliary air inlet chamber below said conduit and separated therefrom by said intermediate member, said chamber being adapted for connection to a source of heated air, said intermediate member including a pair of depending flanges separating said chamber from said channels, said flanges having openings permitting generally horizontal air flow from said chamber to said channels, a pivot pin supported by said intermediate member at the bottom of said conduit between said end and said channels, a damper member pivoted on said pin and having a main blade portion extending upwardly and downstream therefrom in said conduit for controlling flow through said end and a pair of lateral blade portions disposed in said channels and adapted to traverse said flange openings for controlling heated air flow therethrough independent of the rate of air flow therethrough, and means for positioning said damper member to obstruct ambient air flow and to permit heated air flow at induction air flow temperatures below a selected value, to permit ambient air flow and to obstruct heated air flow at induction air flow temperatures above the selected value, to proportion ambient air flow and heated air flow to maintain the selected induction air flow temperature, and further to permit ambient air flow and to obstruct heated air flow irrespective of induction air flow temperature at induction air flow rates above a selected value.

* * * * *